United States Patent
Broniak et al.

(10) Patent No.: US 8,525,083 B2
(45) Date of Patent: Sep. 3, 2013

(54) WATER HEATER WITH POWER CONSUMPTION REPORTING

(75) Inventors: Jay Andrew Broniak, Louisville, KY (US); Joseph Mark Brian, Louisville, KY (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 12/884,471

(22) Filed: Sep. 17, 2010

(65) Prior Publication Data

US 2012/0067860 A1    Mar. 22, 2012

(51) Int. Cl.
*H05B 1/02* (2006.01)

(52) U.S. Cl.
USPC ........... 219/494; 219/506; 219/483; 219/412; 307/39

(58) Field of Classification Search
CPC ..................................... H05B 1/02; H02J 4/00
USPC ......... 219/494, 492, 497, 506, 507, 483–486, 219/412–414; 307/38–41
See application file for complete search history.

(56) References Cited

U.S. PATENT DOCUMENTS

| | | | |
|---|---|---|---|
| 5,572,438 A * | 11/1996 | Ehlers et al. | 700/295 |
| 5,854,520 A * | 12/1998 | Buck et al. | 307/141 |
| 7,881,831 B2 * | 2/2011 | Patterson et al. | 700/299 |
| 7,962,248 B2 * | 6/2011 | Flohr | 700/291 |
| 8,204,633 B2 * | 6/2012 | Harbin et al. | 700/295 |

\* cited by examiner

*Primary Examiner* — Mark Paschall
(74) *Attorney, Agent, or Firm* — Global Patent Operation

(57) ABSTRACT

A hot water heater and method that includes power consumption reporting to enable consumers to better understand and control the energy usage and/or efficiency of the hot water heater. Monitoring energy consumption of an electric hot water heater having at least one electrical load that is selectively activated by a controller of the hot water heater includes sensing the amount of time the at least one electrical load is activated multiplying the amount of time by a known value corresponding to a power rating of the electrical load to determine energy consumed, and displaying on a display device an indicator corresponding to the energy consumed.

15 Claims, 2 Drawing Sheets

WATER HEATER WITH POWER CONSUMPTION REPORTING

BACKGROUND OF THE DISCLOSURE

The following disclosure relates to energy management, and more particularly to energy management of household consumer appliances, as well as other energy consuming devices and/or systems found in the home. The present disclosure finds particular application to a hot water heater.

Basic hot water heaters generally include a water reservoir, a heating element such as a gas or electric burner, and a thermostat that controls the burner to maintain a set temperature of the water in the reservoir. In general, the temperature of the water is maintained at a relatively constant level corresponding to a set point of the thermostat, for example 140 degrees F, until it is needed. As hot water is dispensed from the reservoir, cold water is admitted thereby lowering the temperature of the water. Once the temperature drops below the set point of the thermostat, the heating element is activated to raise the temperature of the water.

Hot water heaters, and electric hot water heaters in particular, consume a significant amount of household electrical power. By way of example, in some instances a hot water heater consumes more energy than a several other appliances (e.g., washer, dishwasher, refrigerator, etc.) combined. Many consumers are not aware of the amount of energy a hot water heater consumes, or of the impact of the set point temperature on the efficiency and/or energy consumption of a hot water heater.

SUMMARY OF THE DISCLOSURE

A hot water heater is provided that includes power consumption reporting to enable consumers to better understand and control the energy usage and/or efficiency of the hot water heater. By providing the consumer with power consumption information, the consumer can make decisions regarding the set point temperature and/or other scheduling that can not only reduce energy consumption, but also save the consumer money.

According to one aspect, a method of monitoring energy consumption of an electric hot water heater, the hot water heater having at least one electrical load that is selectively activated by a controller of the hot water heater comprises sensing the amount of time the at least one electrical load is activated, multiplying the amount of time by a known value corresponding to a power rating of the electrical load to determine energy consumed, and displaying on a display device an indicator corresponding to the energy consumed.

The sensing can be performed by a microprocessor that senses when the controller activates the load. The hot water heater can have a plurality of electrical loads, and the sensing step can include sensing the amount of time each of the plurality of electrical loads is activated, and the multiplying step can include multiplying the amount of time sensed for each load by a corresponding power rating to determine energy consumed. The method can further comprise the step of summing energy consumed as computed for each load to determine total energy consumption of the hot water heater. The method can further include accessing a lookup table having values corresponding to the power ratings for the at least one load. The displaying step can include displaying at least one of total energy consumption, annual energy consumption, monthly energy consumption, weekly energy consumption, daily energy consumption, hourly energy consumption, and instantaneous energy consumption. The displaying step can include displaying an indicator on a display that is remote from the water heater. The displaying step can include displaying at least one of a numerical value, graphical representation, color, or shape corresponding to energy consumed.

In accordance with another aspect, an electric hot water heater for supplying hot water comprises a cold water inlet; a hot water outlet; an electric heat source for applying heat to a volume of water between the inlet and the outlet; a controller for selectively activating the heat source to heat the water, and a processor configured to: sense an amount of time the electric heat source is activated; and multiply the amount of time by a known value corresponding to a power rating of the electrical load to determine energy consumed by the electric heat source.

The water heater can further comprise a display for displaying an indicator corresponding to the energy consumed by the hot water heater. At least one of total energy consumption, annual energy consumption, monthly energy consumption, weekly energy consumption, daily energy consumption, hourly energy consumption, and instantaneous energy consumption can be displayed on the display. The display can be remote from the water heater. At least one of a numerical value, graphical representation, color, or shape corresponding to energy consumed can be displayed on the display. The hot water heater can have a plurality of electrical loads including the electric heat source, and the processor can be configured to sense the amount of time each of the plurality of electrical loads is activated and multiply the amount of time sensed for each load by a corresponding power rating to determine energy consumed, and further configured to sum the energy consumed as computed for each load to determine total energy consumption of the hot water heater. A lookup table stored in a memory associated with the processor can have at least one value corresponding to the power ratings of the electric heat source. The lookup table can further include power ratings for a plurality of electric loads of the hot water heater.

According to another aspect, a device for monitoring energy usage of an electric hot water heater comprises a processor for sensing an amount of time at least one electrical load of the hot water heater is activated and multiplying the amount of time sensed by a power rating to determine energy consumed.

DETAILED DESCRIPTION OF THE PREFERRED EMBODIMENTS

Figure 1:
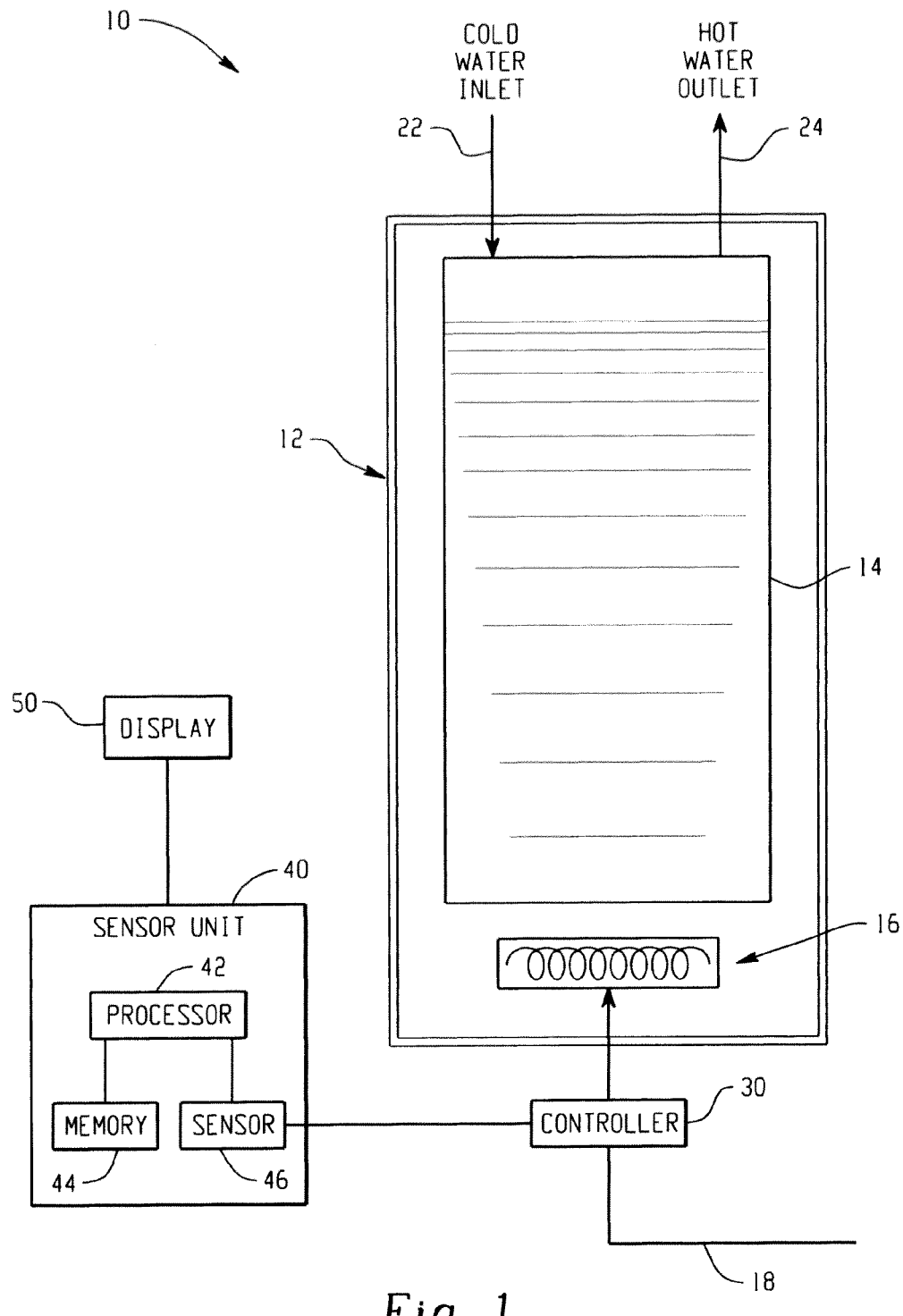
FIG. 1 is a schematic diagram of an exemplary hot water heater in accordance with the present disclosure.

Turning now to the drawings, FIG. 1 illustrates an electric hot water heater 10 including a housing 12 in a which a reservoir 14 tank and a heat source 16 are enclosed. The heat source can be in the form of a resistive heating element, heat pump, or other electric heating device (or any combination thereof). The heat source 16 receives power from an electric power supply 18 and converts the power to thermal energy for heating the water in the tank 14. Cold water is admitted to the reservoir 14 via cold water inlet 22. Hot water is dispensed via a hot water outlet 24 for distribution to one or more hot water taps (not shown) or other hot water discharge (e.g., washing machine).

As will be appreciated a controller 30, such as a thermostat, microprocessor or the like, controls the operation of the heat source. Such controller 30 typically operates to activate the heat source 16 to apply heat to a volume of water within the reservoir 14 to heat the water to a desired set point. The basic components and basic operation of the water heater 10, as described to this point can be conventional, and further details of such conventional water heater are well-known and will not be described further.

In accordance with an aspect of the disclosure, a sensor unit 40 includes a processor 42, a memory 44 and a sensor 46. The sensor 46 is in communication with the controller 30 for sensing energy consumption by the heat source 16 and/or by other electrical loads of the hot water heater. Although the sensor unit 40 is shown in FIG. 1 as a separate component, it will be appreciated that in practice the sensor unit 40 can be integrated with the controller 30, and/or the controller itself can be adapted to perform the functions of the sensor unit as described herein.

As will be appreciated, the hot water heater 10 may have a plurality of electrical loads. For example, some hot water heaters may have a resistive heating element that can be operated at multiple output levels. In many hot water heaters, two or more resistive elements are employed (e.g., upper and lower heating elements). A hybrid electric water heater may include a heat pump and one or more resistive heating elements. The heat pump may typically include both a compressor and a fan, each constituting an electric load. Each of the resistive elements, compressor, fan etc., represent an electrical load.

In operation, the sensor 46 is configured to sense the amount of time each of the one or more electrical loads is activated. This can be done by detecting when the controller 30 activates/deactivates a respective load. That is, the sensor unit can be configured to assume a load is activated when commanded by the controller and likewise deactivated when commanded to deactivate by the controller. Thus, the sensor unit may be configured simply to receive a signal from the controller indicative of activation/deactivation of a given load.

In some embodiments, the sensor may include a device for measuring directly the power consumption of the water heater. Such device could be a submeter adapted to measure power flowing to the hot water heater via the electric power supply line 18, for example.

Each of the electrical loads correspond to a respective power rating that may be stored in memory 44. For example, activation of both resistive heating elements in a standard water heater may draw 5 kW of power, each resistive element drawing approximately 2.5 kW. In a hybrid electric water heater having a heat pump, the resistive heating elements may draw 4.5 kW, while the compressor draws 600 W and the fan 50 W. For a given water heater, the values corresponding to the power rating of each electrical load would be programmed or stored in the memory 44 of the sensor unit (e.g., a lookup table).

Once the sensor 46 has detected activation of one or more loads over time, energy consumption can be calculated by the processor by multiplying the power rating value by the amount of time a particular load is activated. Thus, if the compressor is running for 1.5 hours at a power rating of 600 W, the processor would determine that 900 Wh of energy was consumed by the compressor. By way of further example, consider the following table which illustrates the determination of power consumption by a hot water heater over a 24 hour period.

TABLE 1

| Load Name | Time active over last 24 h | Power Rating | Power Consumption |
| --- | --- | --- | --- |
| Res. Heat element 1 | 1.2 hour | 2.5 kW | 4.5 kWh |
| Compressor | 4.6 hour | 600 W | 2.76 kWh |
| Fan | 4.2 hour | 50 W | 210 Wh |
| TOTAL | | | 7.47 kWh |

In the table above, the sensor detects activation of the one or more loads over a 24 hour period. As will be appreciated, each load may be activated/deactivated multiple times over the 24 hour period, and the second column displays the total time activated for each load over the 24 hour period. Then the processor 42, for each load, multiplies the time active by the power rating (column 3) for the respective load. The power consumption for each load is then provided in the fourth column. To calculate the total energy consumption of the hot water heater over the 24 hour period, the power consumption of each load (column 4) is then summed, resulting in 7.47 kWh of energy consumed over the 24 hour period.

It will be appreciated that the processor 42 can provide power consumption data over any period of time, for example, total energy consumption (lifetime of unit), annual energy consumption, monthly energy consumption, weekly energy consumption, daily energy consumption, hourly energy consumption, as well as instantaneous power consumption.

This energy consumption data is then displayed on the display 50 for viewing by a consumer. The display may be provided as part of the hot water heater, such as part of a control panel or the like, and may optionally display other information in addition to the energy consumption data. For example, the display could be used for programming operation of the hot water heater, such as setting a set point, or turning off the unit. In this regard, the display 50 could be a touchscreen display for allowing a user to input data to the system.

The display 50 can be configured to display a wide variety of data relating to energy consumption. Raw energy consumption data can be displayed, such as the total kWh consumed etc. Some consumers, however, may not find such raw data useful. Accordingly, the display 50 can be configured to display graphical representations of energy consumption. Such graphical representations can include, charts, graphs, colors, shapes, etc. that correspond to energy consumption.

By way of example, when the hot water heater is consuming a small amount of energy, a green image may be displayed to indicate low power operation. As energy consumption increases, the green image can be transitioned to, or replaced by, a red image. Alternatively, a graph showing energy consumption of the hot water heater over time may be displayed, or a chart illustrating energy usage over the past week, month, year, etc. Of course, other types of graphical display can be employed as desired.

Figure 2:
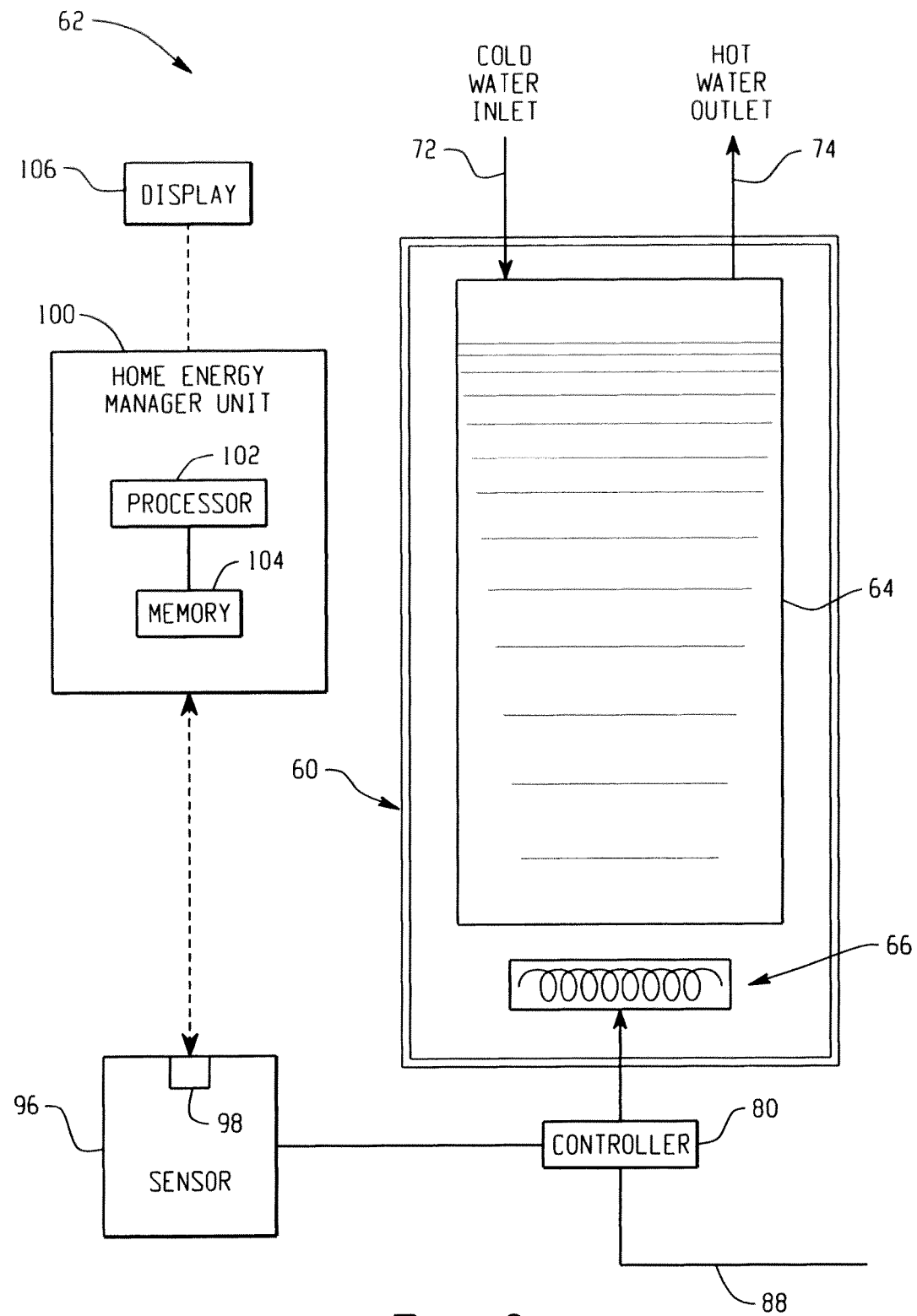
FIG. 2 is a schematic diagram of another exemplary hot water heater in accordance with the present disclosure.

Turning to FIG. 2, another exemplary hot water heater 60 is illustrated as part of a home energy management system 62. Home energy management (HEM) systems are becoming a key to reducing energy consumption in homes and buildings, in a consumer friendly manner. Existing HEMs are commonly in the form of a special custom configured computer with an integrated display, which communicates to devices in the home and stores data, and also has simple algorithms to enable energy reduction.

Key functions of a HEM include:
Creates a network of energy consuming devices within the home, Measures the consumption of the whole home/building or individual devices, Records and stores energy consumption information in a database, and Enables consumer interface with all energy consuming devices in a home to:
view consumption data of individual devices
set preferences for operation of energy consuming devices at different times during the day or at different energy pricing levels
control/program energy consuming devices.

Returning to FIG. 2, the hot water heater includes a reservoir 64 and a heat source 66 connected to an electric power supply 68. A cold water inlet 72 admits water to the reservoir 64, while hot water flows from the reservoir 64 via hot water outlet 74. As will be understood, a controller 80 controls the heat source 56 in a conventional manner to heat the water in the reservoir 54.

A sensor 96 is provided for sensing the activation of one or more loads of the hot water heater 60, as previously described. In this embodiment, however, the sensor 96 is a separate unit that includes a communication interface 98 for communicating with a home energy manager (HEM) unit 100 that includes a processor 102 and a memory 104. A display 106 is connected to the HEM 100 for displaying information related to energy consumption of the hot water heater 60 to a consumer.

The sensor 96 can be installed on the water heater 60 and can communicate data sensed to the HEM for use by the HEM 100. In this regard, the communication interface 98 can be any suitable wired or wireless interface such as WIFI, Bluetooth, Zigbee, Ethernet, etc.

As will be appreciated, the sensor 96 operates in the same manner as the previously described sensor to detect activation of one or more electrical loads of the hot water heater 60 by the controller 80. The sensor 96 then relays such information to the HEM 100 via the communication interface 98, and the processor 102 calculates the energy consumption of the hot water heater 60 in the manner set forth previously. As with the embodiment of FIG. 1, it will be appreciated that the sensor 96 can be integrated with the controller 80 and/or the controller 80 can be configured to perform the functions of the sensor 96.

By providing the information to the HEM unit 100, the energy usage of the hot water heater 60 can be calculated and displayed to a consumer in the same manner as described in connection with FIG. 1. This can provide a more convenient interface for a consumer since, unlike a water heater that is often installed in a basement or closet (or otherwise out-of-sight), the display 106 associated with the HEM unit 100 is more likely installed in a readily accessible location. For example, a HEM unit 100 may be installed in a kitchen or laundry room. Accordingly, display of energy consumption information is more likely to be seen by a consumer in such configuration.

Moreover, the energy consumption data can be utilized by the HEM unit 100 in its functions to actively manage energy use within the household. For example, given that the HEM unit 100 is uniquely aware of energy consumption of other devices in a household that consume hot water, such as a dishwasher, clothes washer, etc., the HEM unit 100 can utilize such information in combination with the energy consumption data relating to the water heater to usage to customize control of the water heater. For example, starting the dishwasher could be delayed until late in the evening after evening showers are taken. In a home having a hybrid electric water heater, delaying operation of the dishwasher can represent more efficient operation since it may be possible to utilize only the more efficient heat pump rather than the resistive heating elements. Other uses of the energy consumption data are also possible.

As will be appreciated, the processor 102 and memory 104 of the present embodiment are housed within the home energy management unit 100, separate from the sensor 96. However, it will be understood that the sensor 96, communication interface, 98, processor 102 and memory 104 could all be provided as a separate sensor unit, similar to the sensor unit 40 of FIG. 1. Further, such sensor unit could be integrated with the controller 80 and/or the controller 80 can be configured to perform the various functions of the sensor/sensor unit as described above.

The disclosure has been described with reference to the preferred embodiments. Obviously, modifications and alterations will occur to others upon reading and understanding the preceding detailed description. It is intended that the disclosure be construed as including all such modifications and alterations.

The invention claimed is:

1. A method of monitoring energy consumption of an electric hot water heater, the hot water heater comprising a plurality of electrical loads that are selectively activated by a controller of the hot water heater, the method comprising:
sensing the amount of time each of the plurality of electrical loads of the hot water heater are activated;
multiplying the amount of time sensed for each of the plurality of electrical loads of the hot water heater by a corresponding power rating of each of the plurality of electrical loads to determine energy consumed; and
displaying on a display energy consumption data comprising energy consumed by each of the plurality of electrical loads of the hot water heater and total energy consumed by the hot water heater.

2. The method as set forth in claim 1, wherein the sensing is performed by a microprocessor that senses when the controller activates each of the plurality of electrical loads.

3. The method as set forth in claim 1, further comprising accessing a lookup table having values corresponding to the power ratings for each of the plurality of electrical loads.

4. The method as set forth in claim 1, wherein the displaying step further includes displaying at least one of annual energy consumption, monthly energy consumption, weekly energy consumption, daily energy consumption, hourly energy consumption, and instantaneous power consumption.

5. The method as set forth in claim 1, wherein the displaying step further includes displaying an indicator on a display that is remote from the hot water heater.

6. The method as set forth in claim 1, wherein the displaying step further includes displaying at least one of a numerical value, graphical or tabular representation, color, or shape corresponding to energy consumed.

7. An electric hot water heater for supplying hot water comprising:
a cold water inlet;
a hot water outlet;
a plurality of electrical loads including an electric heat source for applying heat to a volume of water between the inlet and the outlet;
a controller for selectively activating each of the plurality of electrical loads including the electric heat source; and
a sensor unit comprising:
a sensor configured to sense an amount of time each of the plurality of electrical loads including the electric heat source is activated; and a processor configured to multiply the amount of time each of the plurality of electrical loads including the electric heat source is activated by a known value corresponding to a power rating of each of the plurality of electrical loads including the electric heat source to determine energy consumption data comprising energy consumed by each of the plurality of electrical loads including the electric heat source and the total energy consumed by the electric hot water heater.

8. The electric hot water heater as set forth in claim 7, further comprising a display for displaying an indicator corresponding to the energy consumed by each of the plurality of electrical loads including the electric heat source and the total energy consumed by the hot water heater.

9. The electric hot water heater as set forth in claim 8, wherein at least one of, annual energy consumption, monthly energy consumption, weekly energy consumption, daily energy consumption, hourly energy consumption, and instantaneous power consumption is displayed on the display.

10. The electric hot water heater as set forth in claim 8, wherein the display is remote from the hot water heater.

11. The electric hot water heater as set forth in claim 8, wherein at least one of a numerical value, graphical or tabular representation, color, or shape corresponding to energy consumed is displayed on the display.

12. The electric hot water heater as set forth in claim 7, further comprising a lookup table stored in a memory associated with the processor, the lookup table comprising at least one value corresponding to the power rating of the electric heat source.

13. The electric water heater as set forth in claim 12, wherein the lookup table further comprises values corresponding to the power rating of each of the plurality of electrical loads.

14. A device for monitoring energy usage of an electric hot water heater comprising a plurality of electrical loads, the device comprising:
    a sensor configured to sense an amount of time each of the plurality of electrical loads are activated; and
    a processor configured to multiply the amount of time each of the plurality of electrical loads are activated by a known value corresponding to a power rating of each of the electrical loads to determine energy consumption data comprising energy consumed by each of the plurality of electrical loads and the total energy consumed by the hot water heater.

15. The device as set forth in claim 14, further comprising a lookup table stored in a memory associated with the processor, the lookup table comprising the power rating of each of the plurality of electrical loads.

\* \* \* \* \*

UNITED STATES PATENT AND TRADEMARK OFFICE
CERTIFICATE OF CORRECTION

PATENT NO.        : 8,525,083 B2
APPLICATION NO.   : 12/884471
DATED             : September 3, 2013
INVENTOR(S)       : Broniak et al.

Page 1 of 1

It is certified that error appears in the above-identified patent and that said Letters Patent is hereby corrected as shown below:

In the Claims:

In Column 7, Line 17, in Claim 9, delete "one of," and insert -- one of --, therefor.

Signed and Sealed this
Twenty-sixth Day of November, 2013

Margaret A. Focarino
*Commissioner for Patents of the United States Patent and Trademark Office*